(12) United States Patent
Kishi et al.

(10) Patent No.: US 9,464,146 B2
(45) Date of Patent: Oct. 11, 2016

(54) CHLOROPRENE RUBBER, METHOD FOR PRODUCING SAME, CHLOROPRENE RUBBER COMPOSITION AND VULCANIZED PRODUCT OF CHLOROPRENE RUBBER COMPOSITION

(71) Applicant: DENKI KAGAKU KOGYO KABUSHIKI KAISHA, Tokyo (JP)

(72) Inventors: Sachiyo Kishi, Itoigawa (JP); Hiroyuki Yashima, Itoigawa (JP); Hidehiro Matsuda, Itoigawa (JP)

(73) Assignee: DENKA COMPANY LIMITED, Tokyo (JP)

( * ) Notice: Subject to any disclaimer, the term of this patent is extended or adjusted under 35 U.S.C. 154(b) by 14 days.

(21) Appl. No.: 14/417,007

(22) PCT Filed: Jun. 17, 2013

(86) PCT No.: PCT/JP2013/066614
§ 371 (c)(1),
(2) Date: Jan. 23, 2015

(87) PCT Pub. No.: WO2014/017216
PCT Pub. Date: Jan. 30, 2014

(65) Prior Publication Data
US 2015/0183900 A1    Jul. 2, 2015

(30) Foreign Application Priority Data

Jul. 25, 2012 (JP) ................. 2012-164574

(51) Int. Cl.
C08F 36/18 (2006.01)
C08L 11/00 (2006.01)
C08L 93/04 (2006.01)
C08F 136/18 (2006.01)
C08F 236/18 (2006.01)

(52) U.S. Cl.
CPC .............. *C08F 36/18* (2013.01); *C08F 136/18* (2013.01); *C08F 236/18* (2013.01); *C08L 11/00* (2013.01); *C08L 93/04* (2013.01)

(58) Field of Classification Search
CPC .... C08F 36/18; C08F 236/18; C08F 136/18; C08L 11/00; C08L 93/04
See application file for complete search history.

(56) References Cited

U.S. PATENT DOCUMENTS

2012/0302665 A1    11/2012  Wang et al. .................. 523/157
2013/0245202 A1*    9/2013  Kabayashi et al. ........ 525/331.3

FOREIGN PATENT DOCUMENTS

| DE | 42 05 419 A1 | 8/1993 |
| EP | 0 426 024 A1 | 5/1991 |
| EP | 2507310 A2 | 10/2012 |
| GB | 758397 A | 4/1954 |
| JP | 10-87999 A | 4/1998 |
| JP | 11-60960 A | 3/1999 |
| JP | 11-60961 A | 3/1999 |
| JP | 2005-60546 A | 3/2005 |
| JP | 2008-63588 A | 3/2008 |
| JP | 2010-100863 A | 5/2010 |
| JP | 2013-512331 A | 4/2013 |
| JP | 5549856 B2 | 7/2014 |
| WO | WO 93/17073 A1 | 9/1993 |
| WO | WO 2011/068846 A2 | 6/2011 |
| WO | WO 2012070347 A1 * | 5/2012 |

OTHER PUBLICATIONS

International Search Report dated Sep. 10, 2013, issued to the corresponding International Application No. PCT/JP2013/066614.
European Supplementary Search Report dated Jan. 26, 2016, issued to European Application 13823756.5.

* cited by examiner

*Primary Examiner* — Robert Jones, Jr.
(74) *Attorney, Agent, or Firm* — Stein IP, LLC

(57) ABSTRACT

Provided are a chloroprene rubber that is less adhesive to rolls and gives a vulcanized product superior in physical properties, a production method thereof, a chloroprene rubber composition and a vulcanized product thereof. A chloroprene rubber comprising a steroid skeleton-containing compound. The chloroprene rubber may contain a steroid skeleton-containing compound in an amount of 0.01 to 1 mass %. A vulcanized product is prepared by vulcanizing a composition containing the chloroprene rubber. The chloroprene rubber can be prepared, for example, by emulsion-polymerizing chloroprene alone or chloroprene and other monomers in combination in the presence of a rosin containing a steroid skeleton-containing compound.

6 Claims, No Drawings

CHLOROPRENE RUBBER, METHOD FOR PRODUCING SAME, CHLOROPRENE RUBBER COMPOSITION AND VULCANIZED PRODUCT OF CHLOROPRENE RUBBER COMPOSITION

CROSS-REFERENCE TO RELATED APPLICATIONS

This application is a national stage of International Application No. PCT/JP2013/066614, filed Jun. 17, 2013, which claims the benefit of priority to Japanese Application No. 2012-164574, filed Jul. 25, 2012, in the Japanese Patent Office. All disclosures of the documents named above are incorporated herein by reference.

BACKGROUND OF THE INVENTION

1. Field of the Invention

The present invention relates to a chloroprene rubber, a method for producing the same, a chloroprene rubber composition and a vulcanized product thereof. More specifically, it relates to a chloroprene rubber for use in general industrial rubber products and processed goods such as automobile parts.

2. Description of the Related Art

Chloroprene rubbers, which are superior in heat resistance, weather resistance, ozone resistance, chemical resistance, and others, have been used in various fields including general industrial rubber products and automobile parts. Such molded chloroprene rubber articles are generally produced by molding a composition containing a chloroprene rubber, a vulcanizing agent, a vulcanization accelerator, a filler, and others into a particular shape and vulcanizing the molded article.

These chloroprene rubber compositions have a disadvantage that the rubber compositions are adhesive to rolls during roll processing, leading to deterioration in processability. Thus proposed as a method for reducing the adhesiveness to rolls was a means of blending 1 to 50 parts by mass of a chlorinated polyethylene to 100 parts by mass of a chloroprene rubber (see Patent Document 1).

The vulcanized product of the chloroprene rubber composition is also desired to be superior in physical properties such as tensile strength and tear strength. Thus proposed as a method for improving these physical properties was a means of blending 0.5 to 2.0 parts by mass of a fatty acid having a carbon number of 36 or more to 100 parts by mass of a chloroprene rubber (see Patent Document 2).

Also proposed as a method for reducing adhesiveness of the rubber composition to rolls and improving the physical properties of the vulcanized product was a means of producing a chloroprene rubber comprising polymerizing 2-chloro-1,3-butadiene: 80 to 99.7 parts by mass, sulfur: 0.3 to 2 parts by mass, and a monomer copolymerizable with 2-chloro-1,3-butadiene: 0 to 19.7 parts by mass at a polymerization temperature of 35 to 40° C., terminating the polymerization when the conversion rate reaches 70 to 90%, adding a thiuram compound, and peptizing the resulting mixture to a Mooney viscosity of 51 to 67 (see Patent Document 3).

CITATION LIST

Patent Literatures

[Patent Document 1] JP-A No. 2005-60546
[Patent Document 2] JP-A No. 2008-63588
[Patent Document 3] JP-A No. 2010-100863

SUMMARY OF THE INVENTION

Technical Problem

However, the chloroprene rubber composition described in Patent Document 1 may have mechanical properties lower under low temperature environment, as it contains a chlorinated polyethylene having no double bond in the main chain.

Alternatively, the chloroprene rubber composition described in Patent Document 2, which contains a fatty acid, shows an adverse effect on vulcanization behavior. In addition, chloroprene rubber compositions containing a fatty acid in a large amount may become less adhesive to fibers and molds, thus leading to deterioration in appearance such as blooming. In the case of the method described in Patent Document 3, the chloroprene rubber for use is restricted to sulfur-modified rubbers.

For the reasons above, there is a demand for a new method that is applicable generally to chloroprene rubbers and leads to improvement in adhesiveness to rolls.

Accordingly, main objects of the present invention are to provide a chloroprene rubber that is less adhesive to rolls and gives a vulcanized product with improved physical properties after vulcanization, a production method thereof, a chloroprene rubber composition, and a vulcanized product thereof.

Solution to Problem

The chloroprene rubber according to the present invention contains a steroid skeleton-containing compound.

The steroid skeleton-containing compound may be contained in an amount of 0.01 to 1 mass % in the chloroprene rubber.

The chloroprene rubber can be obtained, for example, by emulsion-polymerizing chloroprene alone or chloroprene and other monomers in combination in the presence of a rosin containing a steroid skeleton-containing compound.

The method for producing a chloroprene rubber according to the present invention comprises emulsion-polymerizing chloroprene alone or chloroprene and other monomers in combination in the presence of a rosin containing a steroid skeleton-containing compound.

The rosin used may then comprise the steroid skeleton-containing compound in an amount of 0.2 to 20 mass %.

The chloroprene rubber composition according to the present invention is chloroprene rubber composition containing the chloroprene rubber described above.

The vulcanized product according to the present invention is a product obtained by vulcanizing the chloroprene rubber composition described above.

Advantageous Effects of Invention

It is possible according to the present invention to reduce adhesiveness of a chloroprene rubber to rolls and improve the physical properties of the vulcanized product obtained by vulcanization.

DETAILED DESCRIPTION OF THE EMBODIMENTS

Hereinafter, favorable embodiments of the present invention will be described in detail. It should be understood that the present invention is not limited to the embodiments described below.

<Chloroprene Rubber>

The chloroprene rubber in the present embodiment contains a chloroprene polymer as the major component and a steroid skeleton-containing compound additionally.

[Chloroprene Polymer]

The chloroprene polymer is a homopolymer of 2-chloro-1,3-butadiene (hereinafter, referred to as chloroprene) or a copolymer of chloroprene and other monomers. Examples of the monomers copolymerizable with chloroprene include acrylic esters such as methyl acrylate, butyl acrylate, and 2-ethylhexyl acrylate; methacrylic esters such as methyl methacrylate, butyl methacrylate, and 2-ethylhexyl methacrylate; hydroxy(meth)acrylates such as 2-hydroxyethyl (meth)acrylate, 2-hydroxymethyl(meth)acrylate, and 2-hydroxypropyl(meth)acrylate; 2,3-dichloro-1,3-butadiene, 1-chloro-1,3-butadiene, butadiene, isoprene, ethylene, styrene, acrylonitrile, and the like.

The monomers copolymerizable with chloroprene may be used alone or in combination of two or more. The polymer structure of the chloroprene polymer is not particularly restricted.

[Steroid Skeleton-Containing Compound]

Examples of the steroid skeleton-containing compounds include 5a-ergost-8(14)-ene represented by Chemical Formula 1, cholest-3-ene represented by Chemical Formula 2, cholesta-3,5-diene represented by Chemical Formula 3, ergost-5-ene-3-ol represented by Chemical Formula 4, cholesta-2,4-diene represented by Chemical Formula 5, cholesta-4-ene represented by Chemical Formula 6, stigmastan-3,5-diene represented by Chemical Formula 7, cholestan-3-ol represented by Chemical Formula 8, ergost-22-en-3-ol represented by Chemical Formula 9, ergosta-5,24(28)-dien-3-ol represented by Chemical Formula 10, cholesterol represented by Chemical Formula 11, campesterol represented by Chemical Formula 12, ergosterol represented by Chemical Formula 13, stigmasterol represented by Chemical Formula 14, β-sitosterol represented by Chemical Formula 15, stigmastanol represented by Chemical Formula 16, γ-sitosterol represented by Chemical Formula 17, brassicasterol represented by Chemical Formula 18, cholestan-5-en-3-one represented by Chemical Formula 19, and the like.

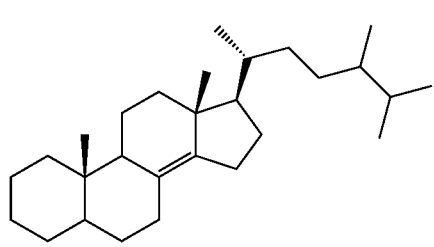

[C. 1]

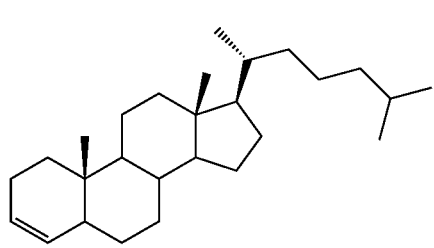

[C. 2]

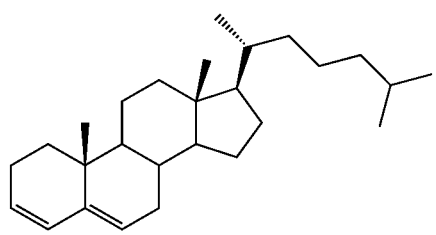

[C. 3]

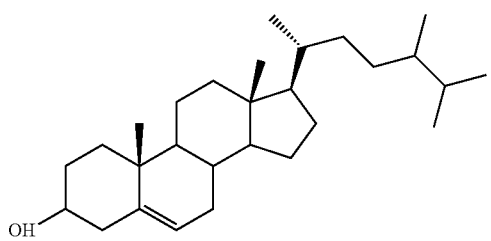

[C. 4]

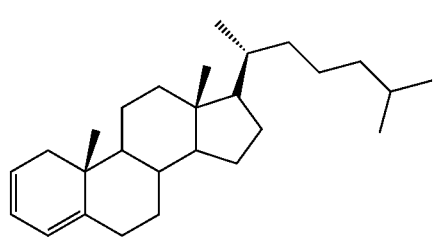

[C. 5]

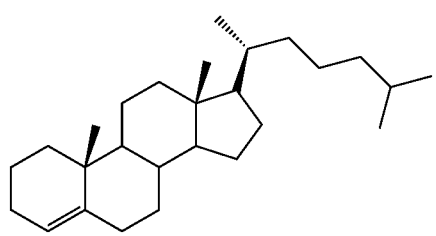

[C. 6]

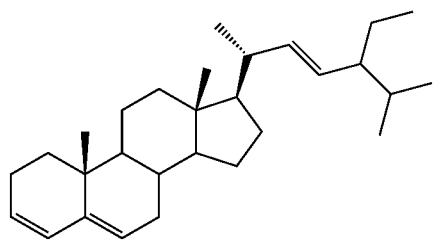

[C. 7]

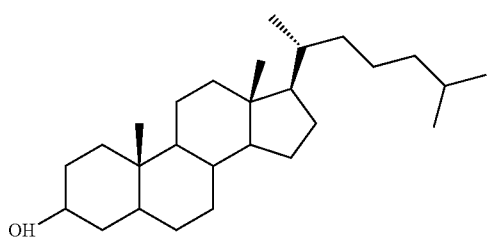

[C. 8]

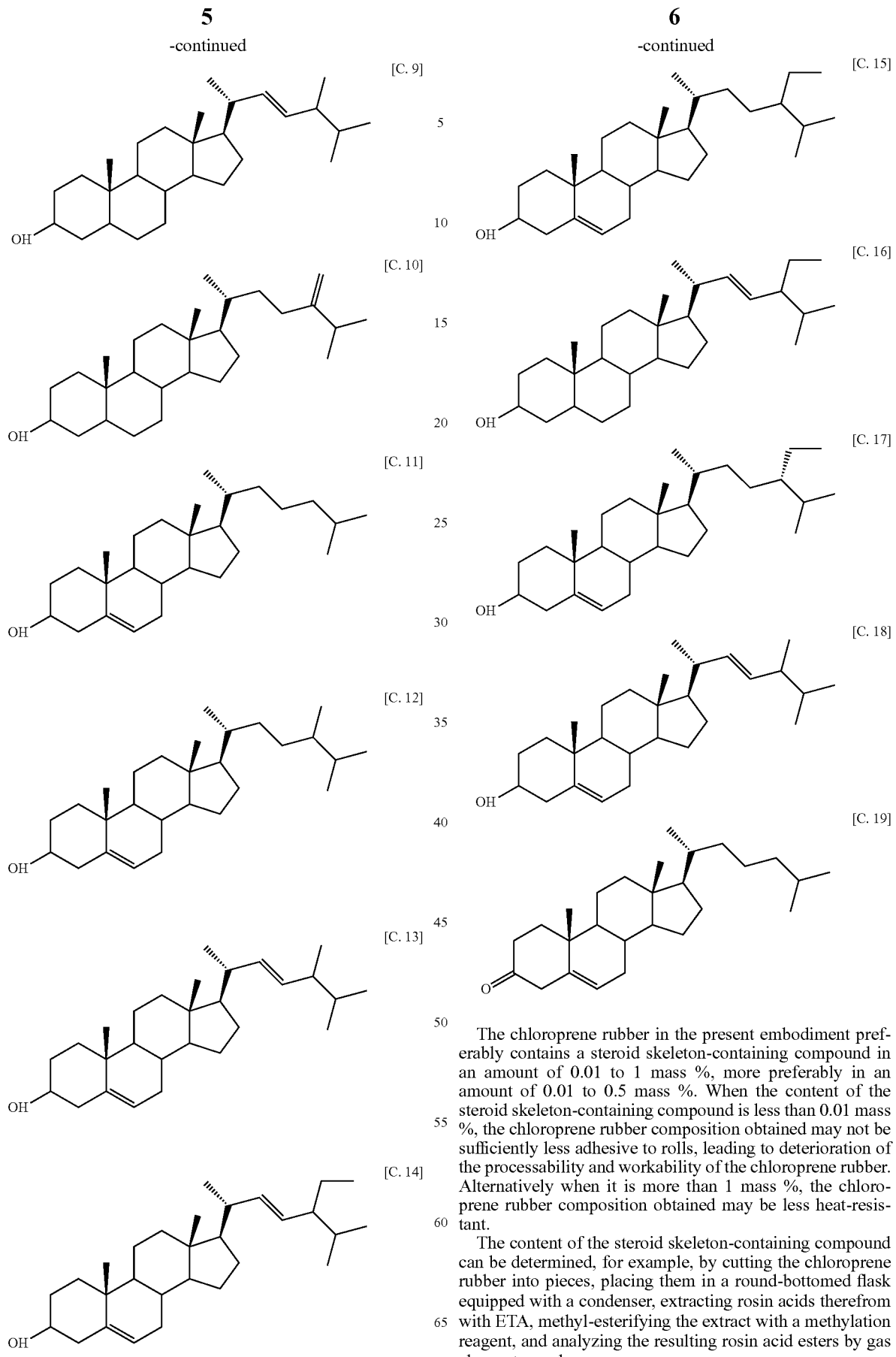

The chloroprene rubber in the present embodiment preferably contains a steroid skeleton-containing compound in an amount of 0.01 to 1 mass %, more preferably in an amount of 0.01 to 0.5 mass %. When the content of the steroid skeleton-containing compound is less than 0.01 mass %, the chloroprene rubber composition obtained may not be sufficiently less adhesive to rolls, leading to deterioration of the processability and workability of the chloroprene rubber. Alternatively when it is more than 1 mass %, the chloroprene rubber composition obtained may be less heat-resistant.

The content of the steroid skeleton-containing compound can be determined, for example, by cutting the chloroprene rubber into pieces, placing them in a round-bottomed flask equipped with a condenser, extracting rosin acids therefrom with ETA, methyl-esterifying the extract with a methylation reagent, and analyzing the resulting rosin acid esters by gas chromatography.

[Production Method]

The chloroprene rubber in the present embodiment is prepared by emulsion-polymerizing raw monomers containing chloroprene as the major component, using a rosin containing a steroid skeleton-containing compound as the emulsifier/dispersant.

The rosin containing a steroid skeleton-containing compound is not particularly limited, but a rosin containing a steroid skeleton-containing compound in an amount of 0.2 to 20 mass % is preferably used. More preferably, a rosin containing a steroid skeleton-containing compound in an amount of 0.3 to 8 mass % is used. When a rosin containing a steroid skeleton-containing compound in an amount of less than 0.2 mass % is used, it may not be possible to improve the physical properties of the vulcanized product obtained and reduce the adhesiveness of the chloroprene composition to rolls, if it is not used in a greater amount during emulsion polymerization. As the rosin containing a steroid skeleton-containing compound in an amount of more than 20 mass % has a lower emulsification efficiency, it may inhibit the chloroprene polymerization or deteriorate the stability of polymerization, thus giving an adverse effect on productivity.

Examples of the catalysts used in the polymerization reaction include inorganic peroxides such as potassium persulfate and organic peroxides such as ketone peroxides, peroxyketals, hydroperoxides, dialkyl peroxides, and diacyl peroxide. Examples of the catalyst-activating agents include sodium sulfite, potassium sulfite, iron (II) oxide, anthraquinone, sodium ε-sulfonate, formamidinesulfonic acid, L-ascorbic acid, and the like.

The polymerization initiator is not particularly limited and those commonly used in emulsion polymerization of chloroprene can be used. Specifically, persulfate salts such as potassium persulfate, organic peroxides such as tert-butyl hydroperoxide, and the like are used favorably.

The chain-transfer agent is also not particularly limited, and those commonly used in emulsion polymerization of chloroprene can be used. Specifically, known chain-transfer agents including long-chain alkylmercaptans such as n-dodecylmercaptan, tert-dodecylmercaptan, and n-octylmercaptan, dialkylxanthogen disulfides such as diisopropylxanthogen disulfide and diethylxanthogen disulfide as well as iodoform can be used.

The polymerization terminator that is added for termination of polymerization is not particularly limited and those commonly used may be used. Specifically, phenothiazine, para-t-butylcatechol, hydroquinone, hydroquinone monomethylether, diethyl hydroxylamine, thiodiphenylamine, 1,3, 5-trihydroxybenzene, and the like can be used.

The temperature for polymerization of the chloroprene latex is not particularly limited and the polymerization may be carried out at a temperature in the range in which emulsion polymerization is generally carried out. The final polymerization degree of the chloroprene polymer (chloroprene rubber) obtained in the polymerization step described above is not particularly limited, but is preferably controlled arbitrarily in the range of 50 to 100%.

Unreacted monomers are then removed from the polymer solution obtained in the polymerization step (monomer removal). The method is not particularly limited and known methods such as heating under reduced pressure are applicable. However, when the productivity is taken into consideration, the final polymerization degree of the chloroprene polymer is preferably 30% or more.

As described above in detail, the chloroprene rubber in the present embodiment gives a vulcanized product with favorable physical properties and a chloroprene rubber composition less adhesive to rolls.

<Chloroprene Rubber Composition>

The chloroprene rubber composition in the present embodiment contains a chloroprene rubber and additionally a vulcanizing agent, a vulcanization accelerator, a filler, a reinforcing agent, a softener, plasticizer, a lubricant, an aging inhibitor, a stabilizer, a silane-coupling agent, an acid acceptor, and/or the like.

Examples of the vulcanizing agents that can be added to the chloroprene rubber composition include metals such as beryllium, magnesium, zinc, calcium, barium, germanium, titanium, tin, zirconium, antimony, vanadium, bismuth, molybdenum, tungsten, tellurium, selenium, iron, nickel, cobalt, and osmium; the oxides and hydroxides thereof, and the like. In particular among these metal compounds, calcium oxide, zinc oxide, antimony dioxide, antimony trioxide, and magnesium oxide are favorable, as they have higher vulcanization efficiency. These vulcanizing agents may be used in combination of two or more.

The vulcanization accelerators for use include thiourea-based vulcanization accelerators, thiuram-based vulcanization accelerators, sulfenamide-based vulcanization accelerators, and the like. In particular among the compounds above, ethylene thiourea, which is superior in the balance between processability and the physical properties of vulcanized product, is preferable. These vulcanization accelerators may be used in combination of two or more.

The chloroprene rubber composition may contain, as needed, a softener, a filler, a reinforcing agent, a plasticizer, a processing aid, a lubricant, an aging inhibitor, a stabilizer, a silane-coupling agent, and/or the like.

The filler and the reinforcing agent for use, as blended to the chloroprene rubber composition, may be those commonly used in chloroprene rubber application and examples thereof include carbon black, silica, clay, talc, calcium carbonate, and the like.

The plasticizers for use can also be those commonly used in chloroprene rubber application and examples thereof include dioctyl phthalate, dioctyl adipate, and the like.

The aging inhibitor for use may be an aging inhibitor commonly used in chloroprene rubber application. Typical examples thereof include amine-based aging inhibitors, imidazole-based aging inhibitors, metal carbamate salt, phenol-based aging inhibitors, waxes, and the like and these aging inhibitors may be used alone or in combination. In particular among these aging inhibitors, an amine-based aging inhibitors, such as 4,4'-bis($\alpha,\alpha$-dimethylbenzyl)diphenylamine or an octylated diphenylamine, may lead to improvement of the heat resistance of molded article, when used.

The softener for use may be a softener commonly used in chloroprene rubber application. Typical examples thereof for use include lubricating oils, process oils, paraffins, liquid paraffins, vaselines, petroleum softeners such as petroleum asphalts, and vegetable oil-based softeners such as rapeseed oil, flaxseed oil, castor oil, and coconut oil, and these softeners may be used alone or in combination.

The chloroprene rubber composition can be vulcanized into a vulcanized product by a known method such as press vulcanization, injection-molding vulcanization, vulcanizer vulcanization, UHF vulcanization, LCM vulcanization, or HFB vulcanization. The vulcanization temperature then may be set to an arbitrary value according to the composition of the chloroprene rubber composition and the kind of the vulcanizing agent, but it is normally preferably in the range of 130 to 190° C. and more preferably in the range of 140 to 180° C.

As described above in detail, the chloroprene rubber composition in the present embodiment, which contains a chloroprene rubber containing a steroid skeleton-containing compound, gives a vulcanized product superior in physical properties such as tensile strength and compression set and reduces adhesiveness thereof to rolls during processing.

EXAMPLES

Hereinafter, advantageous effects of the present invention will be described more specifically with reference to Examples and Comparative Examples of the present invention.

Preparation of Chloroprene Rubber

Example 1

To a reactor with a capacity of 5 liters containing 100 parts by mass of water and 4.0 parts by mass of rosin A, 100 parts by mass of chloroprene monomer and 0.2 parts by mass of n-dodecylmercaptan were added under nitrogen stream, as the mixture was agitated.

The mixture was then allowed to polymerize under nitrogen environment at 40° C., using 0.1 parts by mass of potassium persulfate as the catalyst; when the final polymerization degree reached 64%, an emulsion containing 0.03 parts by mass of phenothiazine was added thereto for termination of polymerization; and unreacted monomers were removed under reduced pressure. Then, the pH of the chloroprene-based polymer (chloroprene latex) was controlled to 7.0, using dilute acetic acid. Freeze-solidification drying of the mixture gave a chloroprene rubber sheet.

The rosins A to H used respectively in Examples and Comparative Examples are those containing a steroid skeleton-containing compound shown in the following Table 1.

Specifically, they are as follows:

Rosin A; a disproportionated rosin acid sodium salt produced by Harima Chemicals, Inc.

Rosin B; a disproportionated rosin acid potassium salt produced by Harima Chemicals, Inc.

Rosin C; a disproportionated tall oil soap produced by Harima Chemicals, Inc.

Rosin D; a tall oil rosin produced by Harima Chemicals, Inc.

Rosin E; mixture of 70 parts by mass of rosin B and 30 parts by mass of soy bean oil Rosin F; mixture of 65 parts by mass of rosin B and 35 parts by mass of soy bean oil, Rosin G; mixture of 10 parts by mass of rosin B and 90 parts by mass of rosin H (shown below)

Rosin H; a disproportionated rosin produced by Arakawa Chemical Industries, Ltd.

The content of the steroid skeleton-containing compound can be determined by cutting the chloroprene rubber sheet into pieces, placing them in a round-bottomed flask equipped with a condenser, extracting rosin acids therefrom with ETA, methyl-esterifying the extract with a methylation reagent, and analyzing the esters by gas chromatography under the condition shown below.

[Gas Chromatographic Analysis Condition]

Instrument: 6890A produced by Agilent

Column: J&W DB-5, (diameter: 0.25 mm×30 m) produced by Agilent

Mass spectrometer: Jms-Q1000GC MkII produced by JASCO Corp.

Carrier: He 17.4 psi

Injection temperature: 320° C., splitless

Detector: TIC

Detector temperature: 320° C.

$H_2$ flow rate: 30 ml/min

Air flow rate: 300 ml/min

Column temperature: 50° C. (hold 0.33 min)→150° C. (6° C./min)→320° C. (5° C./min)

Make-up gas: He, 30 ml/min

TABLE 1

| Compound name | Content (mass %) | | | | | | | |
|---|---|---|---|---|---|---|---|---|
| | Rosin A | Rosin B | Rosin C | Rosin D | Rosin E | Rosin F | Rosin G | Rosin H |
| 5a-Ergost-8 (14)-ene | 0.067 | 0.050 | 0.009 | 0.095 | 0.035 | 0.033 | 0.005 | 0 |
| Cholest-3-ene | 0.040 | 0.033 | 0.008 | 0.040 | 0.023 | 0.021 | 0.003 | 0 |
| Cholesta-3,5-diene | 0.030 | 0.049 | 0.009 | 0.108 | 0.034 | 0.032 | 0.005 | 0 |
| Ergost-5-ene-3-ol | 0 | 0 | 0 | 0.484 | 0 | 0 | 0 | 0 |
| Cholesta-2,4-diene | 0.032 | 0.023 | 0.054 | 0.169 | 0.016 | 0.015 | 0.002 | 0 |
| Cholest-4-ene | 0.529 | 0.388 | 0.124 | 0.000 | 2.450 | 2.793 | 0.039 | 0 |
| Stigmastane-3,5-diene | 0.131 | 0.071 | 0.018 | 0.000 | 0.050 | 0.046 | 0.007 | 0 |
| Cholestan-3-ol | 0.486 | 0.362 | 0.067 | 0.952 | 0.253 | 0.235 | 0.036 | 0 |
| Ergost-22-ene-3-ol | 0 | 0 | 0 | 0.321 | 0 | 0 | 0 | 0 |
| Ergosta-5,24-diene-3-ol | 0 | 0 | 0 | 0.122 | 0 | 0 | 0 | 0 |
| Cholesterol | 0.007 | 0.007 | 0.010 | 2.766 | 1.616 | 1.884 | 0.001 | 0 |
| Campesterol | 0 | 0 | 0.002 | 0.081 | 0 | 0 | 0 | 0 |
| Stigmasterol | 0 | 0.011 | 0.003 | 0.014 | 5.273 | 6.150 | 0.001 | 0 |
| β-Sitosterol | 0 | 0.008 | 0 | 0 | 9.045 | 10.551 | 0.001 | 0 |
| Stigmastanol | 0.007 | 0.012 | 0 | 0.007 | 0.008 | 0.008 | 0.001 | 0 |
| γ-Sitosterol | 0.003 | 0 | 0 | 0 | 1.167 | 1.362 | 0 | 0 |
| Brassicasterol | 0 | 0 | 0 | 0.040 | 0 | 0 | 0 | 0 |
| Steroid total | 1.332 | 1.014 | 0.304 | 5.199 | 19.970 | 23.129 | 0.101 | 0 |

Example 2

The chloroprene rubber of Example 2 was prepared by a method similar to that in Example 1 above, except that the rosin A was replaced with rosin B, as shown in Table 1.

Example 3

The chloroprene rubber of Example 3 was prepared by a method similar to that in Example 1 above, except that the rosin A was replaced with rosin C, as shown in Table 1.

Example 4

The chloroprene rubber of Example 4 was prepared by a method similar to that in Example 1 above, except that the rosin A was replaced with rosin D, as shown in Table 1.

Example 5

The chloroprene rubber of Example 5 was prepared by a method similar to that in Example 1 above, except that the rosin A was replaced with rosin E, as shown in Table 1.

Example 6

The chloroprene rubber of Example 6 was prepared by a method similar to that in Example 3 above, except that the addition amount of rosin C was changed to 3.0 mass %, as shown in Table 1.

Example 7

The chloroprene rubber of Example 7 was prepared by a method similar to that in Example 5 above, except that the addition amount of rosin E was changed to 3.0 mass %, as shown in Table 1.

Example 8

The chloroprene rubber of Example 8 was prepared by a method similar to that in Example 5 above, except that the addition amount of rosin E was changed to 4.5 mass %, as shown in Table 1.

Example 9

The chloroprene rubber of Example 9 was prepared by a method similar to that in Example 8 above, except that the rosin E was replaced with rosin F, as shown in Table 1.

Example 10

The chloroprene rubber of Example 10 was prepared by a method similar to that in Example 9 above, except that the addition amount of rosin F was changed to 3.5 mass %, as shown in Table 1.

Example 11

The chloroprene rubber of Example 11 was prepared by a method similar to that in Example 10 above, except that the rosin F was replaced with rosin G, as shown in Table 1.

Comparative Example 1

The chloroprene rubber of Comparative Example 1 was prepared by a method similar to that in Example 1 above, except that the rosin A was replaced with rosin H, as shown in Table 1.

Chloroprene rubber compositions in the composition shown in the following Table 2 were then prepared respectively from these chloroprene rubbers of Examples and Comparative Example and were evaluated by the methods and under the conditions shown below.

TABLE 2

| Components | | Blending amount (parts by mass) |
| --- | --- | --- |
| Rubber component | Chloroprene rubber | 100 |
| Aging inhibitor | N-Phenyl-1-naphthylamine | 1 |
| Acid acceptor | MgO (#30) | 4 |
| Vulcanizing agent | ZnO (two kinds) | 5 |
| Vulcanization accelerator | Ethylene thiourea | 0.37 |

(Adhesiveness to Rolls)

The adhesiveness to rolls of the chloroprene rubber composition during kneading was evaluated, using an 8-inch open roll heated to 50° C. When the rubber composition can be kneaded repeatedly, as the rubber layer thereof is readily turned over, and there is no deposition of the chloroprene rubber composition on rolls, the adhesiveness was indicated by o, while when there is deposition of the chloroprene composition on rolls, it was indicated by x.

(Processing Properties)

The Mooney viscosity at 100° C. and the scorch time (minute) at 125° C. of the chloroprene rubber composition obtained were determined according to JIS-K 6300.

(Tensile Strength)

Each of the chloroprene rubber compositions obtained were vulcanized under pressure under the condition of 141° C. for 25 minutes, to give a test piece of vulcanized sheet having a thickness of 2 mm, and the tensile strength (MPa) and the elongation (%) of the vulcanized product (vulcanized rubber) were determined in the tensile test according to JIS K 6251.

(Hardness)

The chloroprene rubber composition obtained was vulcanized under pressure under the condition of 141° C. for 25 minutes, a test piece was prepared according to JIS K 6253, and the hardness (Shore A) of the vulcanized product (vulcanized rubber) was determined.

(Heat Resistance)

The chloroprene rubber composition obtained was vulcanized under pressure under the condition of 141° C. for 25 minutes, to give a test piece of vulcanized sheet having a thickness of 2 mm; and the strength, elongation, and hardness of the vulcanized product (vulcanized rubber) were determined according to JIS K 6251 and JIS K 6253 after storage under a high temperature condition at 120° C. for 48 hours and after storage under a high temperature condition at 120° C. for 96 hours for evaluation of the changes in tensile strength, elongation, and hardness.

(Abrasion Resistance)

The chloroprene rubber composition obtained was vulcanized under pressure under the condition of 141° C. for 25 minutes, to give a test piece of vulcanized sheet having a thickness of 2 mm; the amount of wear ($mm^3$) of the vulcanized product (vulcanized rubber) was determined in the DIN abrasion test according to JIS K-6264-2.

(Dynamic Viscoelasticity)

The chloroprene rubber composition obtained was vulcanized under pressure under the condition of 141° C. for 25 minutes, to give a test piece of vulcanized sheet having a thickness of 2 mm; the storage elastic modulus E' (MPa), loss elastic modulus E" (MPa), and loss factor (tanδ) of the vulcanized product (vulcanized rubber) were determined according to JIS K-6394 at 100° C.

(Swelling Degree in Toluene)

The chloroprene rubber composition in the composition shown in Table 2 was immersed in toluene at 23° C. for 24 hours, and the swelling degree of the resulting composition was determined according to JIS K 6250, and the crosslinking density (×10$^{-4}$) was calculated using the Flory-Rehner equation.

(Compression Set)

The chloroprene rubber composition in the composition shown in Table 2 was vulcanized at 141° C. for 35 minutes; the compression sets (%) thereof when tested under the temperature condition of 0° C. for 22 hours and when tested under the temperature condition of 70° C. for 22 hours were determined according to JIS K 6262.

The results thus obtained are summarized in the following Table 3.

TABLE 3

| Test item | | Example 1 | Example 2 | Example 3 | Example 4 | Example 5 | Example 6 | Example 7 |
|---|---|---|---|---|---|---|---|---|
| Kind of rosin | | A | B | C | D | E | C | E |
| Addition amount of rosin (mass %) | | 4.0 | 4.0 | 4.0 | 4.0 | 4.0 | 3.0 | 3.0 |
| Content of steroid skeleton-containing compound in chloroprene rubber (mass %) | | 0.117 | 0.075 | 0.017 | 0.217 | 0.832 | 0.01 | 0.5 |
| Adhesiveness to rolls | | ○ | ○ | ○ | ○ | ○ | ○ | ○ |
| Mooney viscosity | | 48 | 47 | 56 | 55 | 51 | 61 | 67 |
| Scorch time (minute) | | 9.6 | 8.8 | 10.2 | 8.7 | 9.9 | 9.8 | 9.9 |
| Tensile strength (MPa) | | 25.3 | 27.1 | 25.2 | 26.9 | 25.4 | 25.8 | 26.1 |
| Elongation (%) | | 869 | 888 | 870 | 850 | 890 | 1008 | 1012 |
| Hardness (Shore A) | | 40 | 40 | 41 | 42 | 40 | 41 | 40 |
| Tensile strength (N/mm) | | 38 | 37 | 37 | 39 | 36 | 35 | 32 |
| Heat resistance (120° C. × 48 h) | Change in tensile strength (%) | 0 | −6 | 0 | −1 | −5 | −4 | −5 |
| | Change in elongation (%) | −6 | −10 | −5 | −3 | 9 | −8 | −9 |
| | Change in hardness (%) | 5 | 5 | 3 | 4 | 5 | 5 | 5 |
| Heat resistance (120° C. × 96 h) | Change in tensile strength (%) | −4 | 1 | −9 | −5 | −8 | −10 | −21 |
| | Change in elongation (%) | −10 | −16 | 11 | −12 | −15 | −16 | −16 |
| | Change in hardness (%) | 6 | 8 | 8 | 6 | 9 | 9 | 8 |
| Amount of wear (mm$^3$) | | 260 | 362 | 224 | 241 | 255 | 296 | 254 |
| Dynamic viscoelasticity | E' (MPa) | 2.07 | 2.04 | 2.06 | 2.08 | 2.01 | 2 | 2.04 |
| | E'' (MPa) | 0.18 | 0.17 | 0.17 | 0.16 | 0.15 | 0.14 | 0.14 |
| | tan δ | 0.088 | 0.086 | 0.083 | 0.077 | 0.075 | 0.070 | 0.069 |
| Swelling degree in toluene (Crosslinking density (10$^{-4}$)) | | 29.4 | 28.5 | 27.2 | 28.8 | 28.9 | 27.7 | 26.5 |
| Compression set (%) | 0° C. × 22 h | 99.4 | 99.4 | 98.8 | 99.1 | 98.5 | 89.1 | 91 |
| | 70° C. × 22 h | 13.2 | 12.7 | 11.1 | 14.1 | 12.2 | 12.4 | 10.5 |

| Test item | | Example 8 | Example 9 | Example 10 | Example 11 | Comparative Example 1 |
|---|---|---|---|---|---|---|
| Kind of rosin | | E | F | F | G | H |
| Addition amount of rosin (mass %) | | 4.5 | 4.5 | 3.5 | 3.5 | 4.0 |
| Content of steroid skeleton-containing compound in chloroprene rubber (mass %) | | 1.0 | 2.0 | 1.5 | 0.05 | 0 |
| Adhesiveness to rolls | | ○ | ○ | ○ | ○ | × |
| Mooney viscosity | | 49 | 42 | 50 | 47 | 48 |
| Scorch time (minute) | | 10.5 | 11.4 | 11 | 8.7 | 9.1 |
| Tensile strength (MPa) | | 26.7 | 27.1 | 23.9 | 25.6 | 22.7 |
| Elongation (%) | | 1032 | 1039 | 1025 | 891 | 870 |
| Hardness (Shore A) | | 39 | 39 | 41 | 40 | 40 |
| Tensile strength (N/mm) | | 32 | 32 | 31 | 34 | 29 |
| Heat resistance (120° C. × 48 h) | Change in tensile strength (%) | −12 | −15 | −9 | −5 | −14 |
| | Change in elongation (%) | −9 | −10 | −10 | −7 | −19 |
| | Change in hardness (%) | 5 | 6 | 5 | 5 | 5 |
| Heat resistance (120° C. × 96 h) | Change in tensile strength (%) | −19 | −18 | −17 | 3 | −14 |
| | Change in elongation (%) | −19 | −17 | −15 | −13 | −10 |
| | Change in hardness (%) | 9 | 8 | 10 | 10 | 7 |
| Amount of wear (mm$^3$) | | 263 | 242 | 301 | 259 | 334 |
| Dynamic viscoelasticity | E' (MPa) | 2.01 | 2.02 | 2.01 | 2.07 | 2 |
| | E'' (MPa) | 0.15 | 0.15 | 0.16 | 0.18 | 0.2 |
| | tan δ | 0.075 | 0.074 | 0.080 | 0.087 | 0.084 |
| Swelling degree in toluene (Crosslinking density (10$^{-4}$)) | | 24.9 | 24.9 | 23.9 | 28.9 | 28.9 |
| Compression set (%) | 0° C. × 22 h | 88.2 | 84.2 | 86.5 | 99.5 | 100.6 |
| | 70° C. × 22 h | 10.2 | 9.1 | 12.1 | 13.2 | 18.1 |

As shown in Table 3 above, the composition of Comparative Example 1 containing a chloroprene rubber was inferior in the adhesiveness to rolls. It also gave a vulcanized rubber with a lower tensile strength of 22.7 MPa. It also gave a vulcanized rubber with a lower tear strength of 29 N/mm. It also gave a vulcanized rubber with a lower compression set of 18.1% under the condition of 70° C.

In contrast, the compositions each containing the chloroprene rubber of Examples 1 to 11, which contain a steroid skeleton-containing compound, were less adhesive to rolls and gave a vulcanized product superior in physical properties. They are also superior in other physical properties as well.

Although the compositions of Examples 9 and 10 were better than that of Comparative Example 1, the vulcanized sheet thereof showed a change in elongation, as determined in the test for the heat resistance under the condition of 120° C. for 48 hours, and a tear strength smaller than those of other Examples. It is probably because the steroid skeleton-containing compound is contained in the chloroprene rubber in an amount larger than that in other Examples.

The results above confirm that it is possible according to the present invention to obtain a chloroprene rubber that is less adhesive to rolls and gives a vulcanized product with improved physical properties, a production method thereof, a chloroprene rubber composition and a vulcanized product thereof.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A chloroprene rubber comprising a steroid skeleton-containing compound; wherein the chloroprene rubber comprises the steroid skeleton-containing compound in an amount of 0.05 to 0.832 mass %.

2. A method for producing a chloroprene rubber, comprising emulsion-polymerizing chloroprene alone or chloroprene and other monomers in the presence of a rosin containing a steroid skeleton-containing compound, wherein the chloroprene rubber comprises the steroid skeleton-containing compound in an amount of 0.05 to 0.832 mass %.

3. The method for producing a chloroprene rubber according to claim 2, wherein the rosin contains a steroid skeleton-containing compound in an amount of 0.2 to 20 mass %.

4. A chloroprene rubber composition comprising the chloroprene rubber according to claim 1.

5. A vulcanized product prepared by vulcanizing the chloroprene rubber composition according to claim 4.

6. The method for producing a chloroprene rubber according to claim 3, wherein the rosin contains a steroid skeleton-containing compound in an amount of 0.3 to 8.0 mass %.

* * * * *